(12) United States Patent  (10) Patent No.: US 8,952,274 B2
Lalancette  (45) Date of Patent: Feb. 10, 2015

(54) SLEEVE FOR PROTECTING WIRE OR CABLE

(71) Applicant: Thomas & Betts International, Inc., Wilmington, DE (US)

(72) Inventor: Daniel Lalancette, St.-Jean-sur-Richelieu (CA)

(73) Assignee: Thomas & Betts International, Inc., Wilmington, DE (US)

( * ) Notice: Subject to any disclaimer, the term of this patent is extended or adjusted under 35 U.S.C. 154(b) by 134 days.

(21) Appl. No.: 13/912,990

(22) Filed: Jun. 7, 2013

(65) Prior Publication Data

US 2014/0014397 A1  Jan. 16, 2014

Related U.S. Application Data

(60) Provisional application No. 61/669,739, filed on Jul. 10, 2012.

(51) Int. Cl.
*H02G 3/04* (2006.01)
*H02G 3/22* (2006.01)

(52) U.S. Cl.
CPC ...... *H02G 3/04* (2013.01); *H02G 3/22* (2013.01)
USPC .......... 174/480; 174/481; 52/220.8; 138/110; 138/162; 248/56

(58) Field of Classification Search
USPC ............. 174/480, 481; 248/56; 138/110, 162; 52/220.8
See application file for complete search history.

(56) References Cited

U.S. PATENT DOCUMENTS

| 2,115,000 | A | 4/1938 | Abbott |
| 2,870,242 | A | 1/1959 | Wilkerson |
| 3,211,824 | A | 10/1965 | Heiman |
| 3,211,825 | A | 10/1965 | Clos |
| 3,240,869 | A | 3/1966 | Jureit |
| 3,297,815 | A | 1/1967 | Drettmann |
| 3,350,501 | A | 10/1967 | Jureit |
| 3,515,797 | A | 6/1970 | Hochstetler |
| 3,553,346 | A | 1/1971 | Ballantyne |
| 3,689,681 | A | 9/1972 | Searer et al. |

(Continued)

FOREIGN PATENT DOCUMENTS

| CA | 2059776 | 7/1992 |
| CA | 2454745 | 7/2004 |

(Continued)

OTHER PUBLICATIONS

Thomas & Betts, Steel City Catalog, Aug. 2001, p. 67, Box Accessories/Cable Protector, Cat. No. CP-1.

(Continued)

*Primary Examiner* — Dhirubhai R Patel
(74) *Attorney, Agent, or Firm* — Robbie Webb (57) ABSTRACT

A sleeve is provided for protecting wire or cable which is run through an aperture in a stud. The sleeve includes a slit which runs longitudinally along the length of the sleeve for receiving a wire or cable and an opening at each end to allow for entrance and exit of the wire or cable. Extended portions of the sleeve on each end further protect the enclosed wire or cable. A weakened bend line which runs longitudinally along the length of the sleeve and opposite the slit in the sleeve allows the sleeve to be easily bent by hand compression along the bend line so that the sleeve can be easily installed around the wire or cable without the use of any hand tools.

10 Claims, 7 Drawing Sheets

(56) References Cited

U.S. PATENT DOCUMENTS

| | | | |
|---|---|---|---|
| D231,769 S | 6/1974 | Searer et al. | |
| 3,855,413 A | 12/1974 | Baillie | |
| 3,906,586 A | 9/1975 | Arnold | |
| 3,926,030 A | 12/1975 | Baillie | |
| 4,050,205 A | 9/1977 | Ligda | |
| D264,683 S | 6/1982 | Searer | |
| 4,807,417 A | 2/1989 | Bell | |
| 4,845,913 A | 7/1989 | Bell | |
| 4,924,646 A | 5/1990 | Marquardt | |
| 4,981,196 A | 1/1991 | Palm | |
| 5,028,746 A | 7/1991 | Petrich | |
| 5,079,389 A | 1/1992 | Nelson | |
| 5,163,254 A | 11/1992 | Zastrow et al. | |
| 5,359,151 A | 10/1994 | Nattel et al. | |
| 5,488,198 A | 1/1996 | Kramer | |
| 5,560,397 A * | 10/1996 | Miller et al. | 138/110 |
| 5,595,453 A | 1/1997 | Nattel et al. | |
| 5,661,891 A * | 9/1997 | Miller et al. | 29/453 |
| D390,536 S | 2/1998 | Austin | |
| 5,729,938 A * | 3/1998 | Tobias | 52/220.8 |
| 5,739,470 A | 4/1998 | Takeda | |
| 6,061,910 A | 5/2000 | Williamson | |
| 6,062,267 A | 5/2000 | Fleming | |
| 6,241,199 B1 | 6/2001 | Ismert | |
| 6,380,488 B1 | 4/2002 | Takeda et al. | |
| 6,588,714 B2 | 7/2003 | Blane et al. | |
| 6,642,445 B1 | 11/2003 | Lalancette | |
| 6,901,628 B2 | 6/2005 | Cerul | |
| 6,935,079 B1 | 8/2005 | Julian et al. | |
| 7,071,410 B1 | 7/2006 | Kiely | |
| 7,235,740 B2 | 6/2007 | Dinh | |
| 7,273,982 B1 | 9/2007 | Lalancette | |
| 7,601,918 B2 | 10/2009 | Pamperlin | |
| 8,082,701 B1 | 12/2011 | Wendel | |
| 8,161,696 B2 * | 4/2012 | Colwell et al. | 52/220.8 |
| 2003/0126824 A1 | 7/2003 | Jensen | |
| 2005/0126094 A1 | 6/2005 | Shimizu et al. | |
| 2006/0004366 A1 | 1/2006 | Cerul | |
| 2007/0251168 A1 | 11/2007 | Turner | |
| 2008/0127582 A1 | 6/2008 | Turner | |
| 2010/0065328 A1 | 3/2010 | Potter | |

FOREIGN PATENT DOCUMENTS

| | | |
|---|---|---|
| CA | 2519583 | 10/2004 |
| CA | 110133 | 2/2007 |
| CA | 116005 | 2/2007 |
| CA | 2593597 | 6/2008 |
| CA | 2682324 | 10/2008 |
| CA | 2447325 | 2/2010 |
| CA | 2407137 | 7/2010 |
| CA | 2770327 | 2/2011 |
| CA | 2678913 | 3/2011 |
| DE | 19852120 A1 | 3/2000 |
| DE | 10217174 A1 | 10/2003 |
| EP | 0486299 A1 | 5/1992 |
| WO | WO 00/68608 | 11/2000 |

OTHER PUBLICATIONS

Thomas & Betts, Technical/Specification Catalog, 1994, Steel City Box Accessories. Section I p. I/827—Cat. No. CP-1.

* cited by examiner

SLEEVE FOR PROTECTING WIRE OR CABLE

FIELD OF THE INVENTION

In general, the present invention relates to a sleeve for protecting wire or cable which is run through an aperture in a stud. The sleeve comprises a slit which runs longitudinally along the length of the sleeve to accept the wire or cable, an extended portion of the sleeve that extends beyond the stud once the sleeve is installed in the stud, and a weakened bend line that allows the sleeve to be closed around the wire or cable by hand compression without the use of any hand tools.

BACKGROUND

In residential and commercial construction, wires and cables are often run through studs which are used for framing homes and buildings. When the walls are put in place, nails or screws may enter the studs and pierce the wires or cables. An improved method of protection is needed for wires and cables running through studs which provides an easy installation for the installer and which can be installed simultaneously with the wires and cables.

SUMMARY OF THE INVENTION

The present invention provides a sleeve for protecting cable or wire which is run through an aperture in a stud in residential or commercial construction. The sleeve is constructed so that no tools are required to install it on wire or cable. A slit which runs longitudinally along the length of the sleeve allows the sleeve to receive the wire or cable, and a weakened bend line which is located opposite the slit and which also runs longitudinally along the length of the sleeve allows the sleeve to easily enclose around the wire or cable by hand compression, without the use of any hand tools. An extended portion on each end of the sleeve extends beyond the stud once the sleeve is installed in the stud in order to protect the wire or cable from nails or screws which are accidentally driven in along the edge of the stud.

DETAILED DESCRIPTION OF THE PREFERRED EMBODIMENT(S)

The above and other features, aspects and advantages of the present invention will now be discussed in the following detailed description of preferred embodiments and appended claims, which are to be considered in conjunction with the accompanying drawings in which identical reference characters designate like elements throughout the views.

Figure 1:
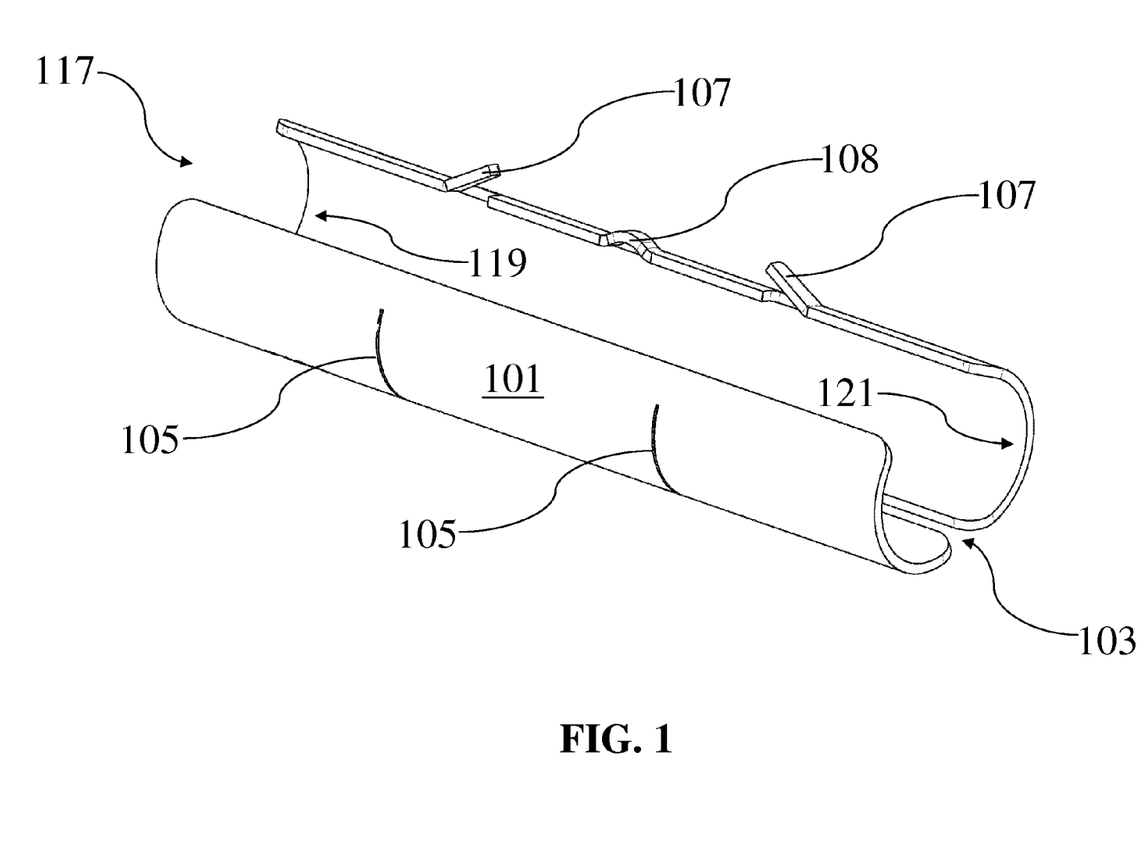
FIG. 1 is a side perspective view of a sleeve for protecting wire or cable of the present invention.
Figure 2:
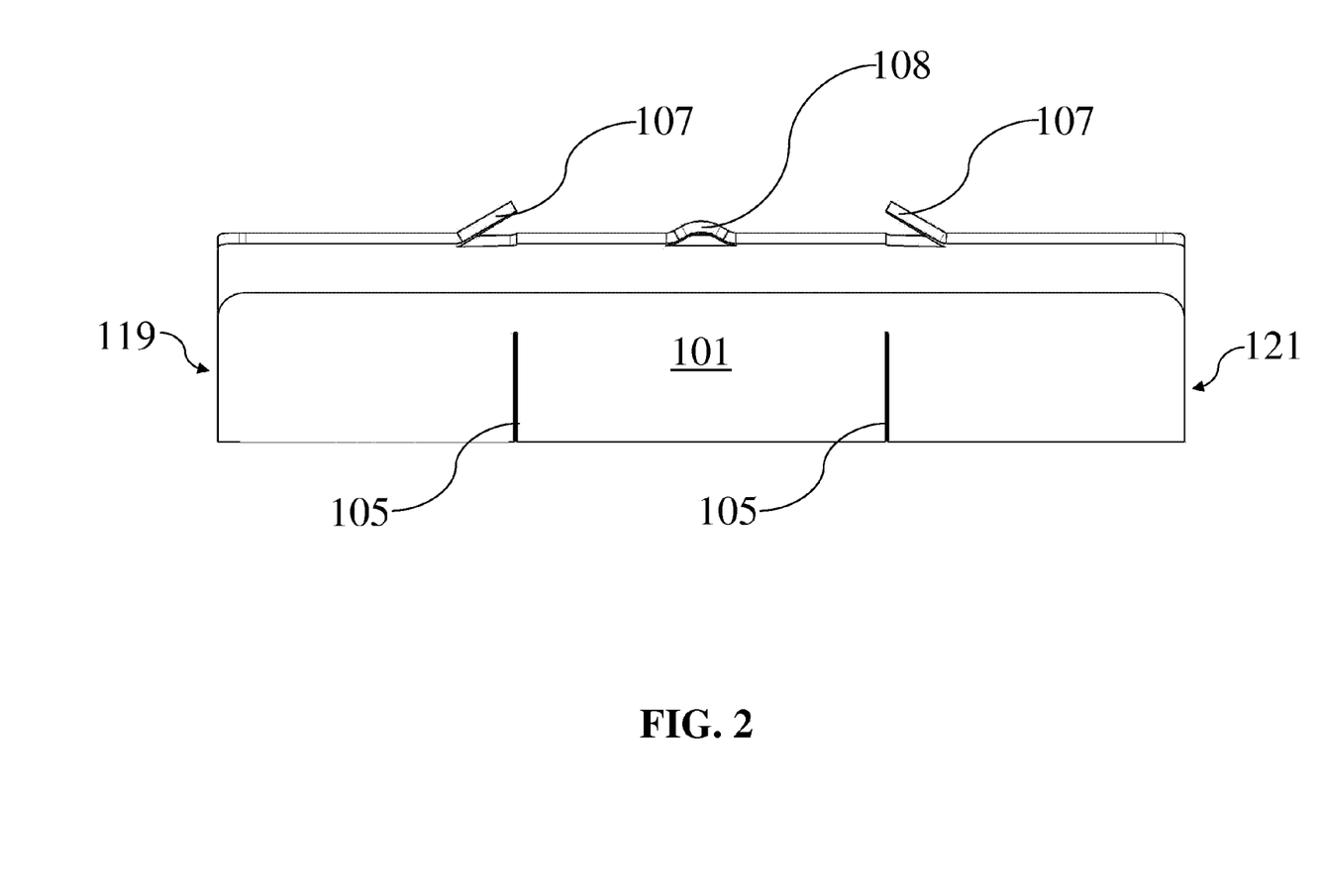
FIG. 2 is an elevation view of a sleeve for protecting wire or cable of the present invention.
Figure 3:
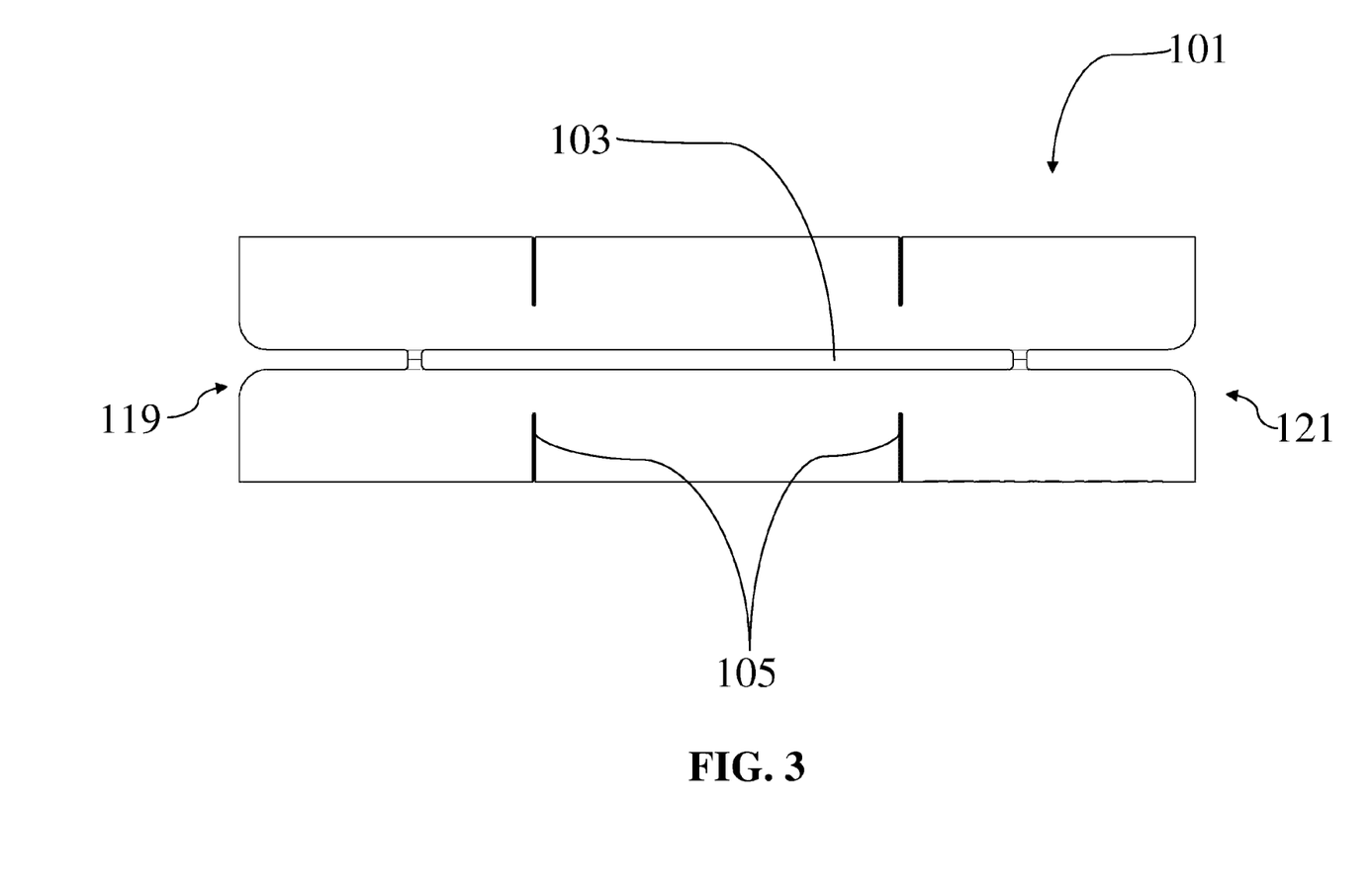
FIG. 3 is a bottom view of a sleeve for protecting wire or cable of the present invention.

Shown in FIG. 1 is a side perspective view of the preferred embodiment of a sleeve for protecting wire or cable of the present invention. The sleeve may be made of an impact resistant, high strength metal material or plastic material, and it may be stamped as a one-piece assembly for ease of production. The sleeve 101 comprises a slit 117 for receiving a wire or cable, and a first opening 119 and second opening 121 which allow for the entrance and exit of the wire or cable once it has been received by the sleeve 101. Also shown in FIG. 1 and in FIG. 2 are visual positioning indicators 105. These visual positioning indicators 105 are located on the outer surface of the sleeve 101 and aid in positioning the sleeve at the correct location within an aperture in a stud once the sleeve has been installed on the wire or cable 115, as is clearly shown in FIG. 5. Although two visual positioning indicators 105 are shown in FIGS. 1, 2, 3, 5 and 7 as part of the sleeve 101, it is understood that one or more visual positioning indicators may be used to achieve the same purpose.

Figure 4:
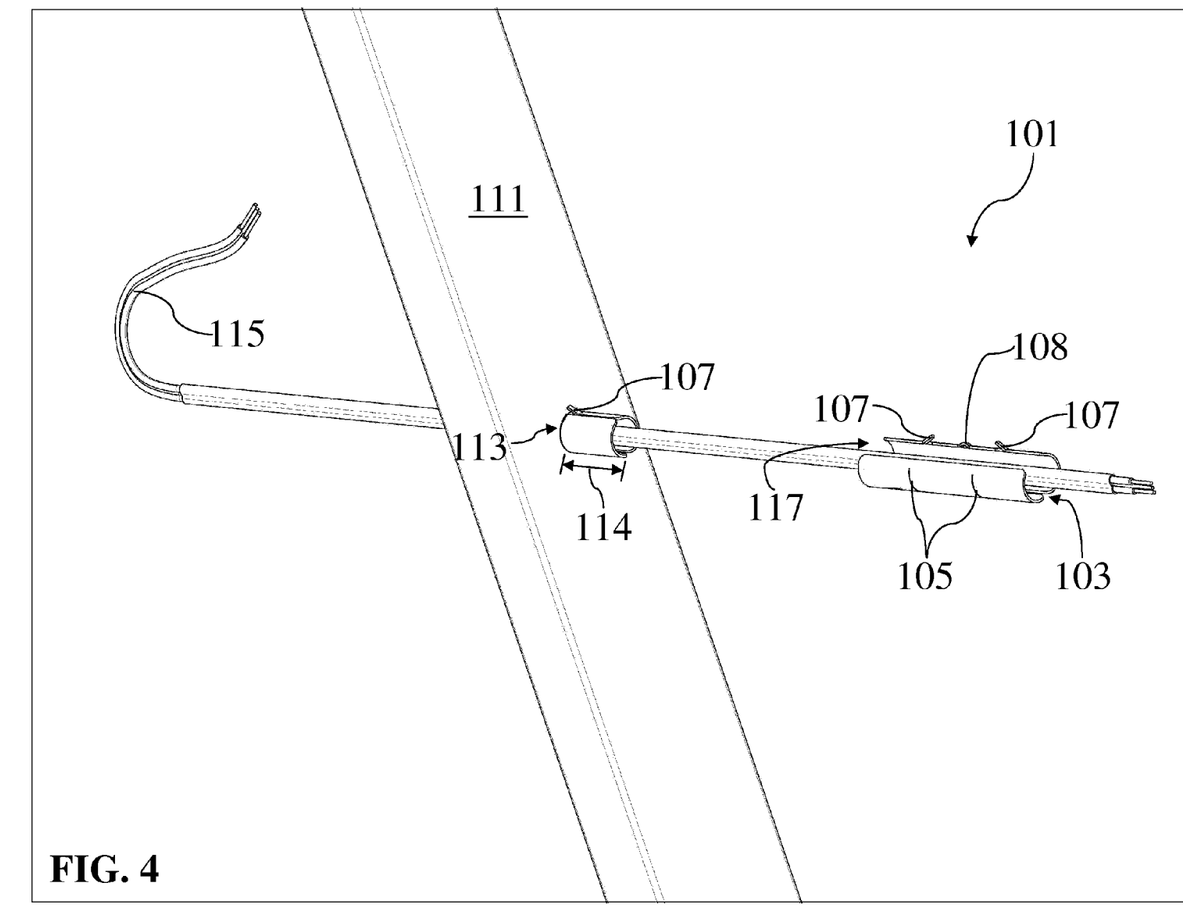
FIG. 4 is a side perspective view of the installation of a sleeve for protecting wire or cable of the present invention.

Also shown in FIGS. 1 and 2 are anti-rotation and stop tabs 107, which comprise a part of the sleeve 101. The stop tabs 107, which are shown in FIGS. 1, 2 and 4, prevent the sleeve from slipping out of the aperture in the stud after installation, and also keep the sleeve from rotating within the aperture, which prevents the slit 117, mentioned in the above paragraph, from rotating toward the face of the stud, therefore preventing a nail or screw which is driven into the stud from passing through the slit and damaging the wire or cable within the sleeve. The tabs 107 are oppositely angled towards the center of the sleeve 101, which allows for easy insertion of the sleeve 101 into the stud aperture 113, regardless of which side of the sleeve is received by the aperture first. From FIG. 4, it can be seen that the tabs 107 also catch on the outside of the stud in once the sleeve 101 has been fully inserted into the stud aperture 113. These stop tabs 107 prevent the sleeve from slipping out of the aperture in the stud once it has been inserted in the aperture. The anti-rotation and stop tabs 107 can also be used to achieve vertical installation of the sleeve 101 around a cable 115 in a stud 111, as is shown in FIG. 6, while preventing the sleeve from falling through the aperture in the stud in.

A second anti-rotation feature is also shown in FIGS. 1, 2 and 4. This feature, the anti-rotation embossment 108, acts as another means to ensure that rotation and slippage of the sleeve 101 is prevented once the sleeve is installed in the stud aperture 113. It is understood that the anti-rotation embossment 108 may be used in conjunction with the anti-rotation and stop tabs 107 or as a stand-alone feature to prevent rotation and slippage of the sleeve 101.

Figure 5:
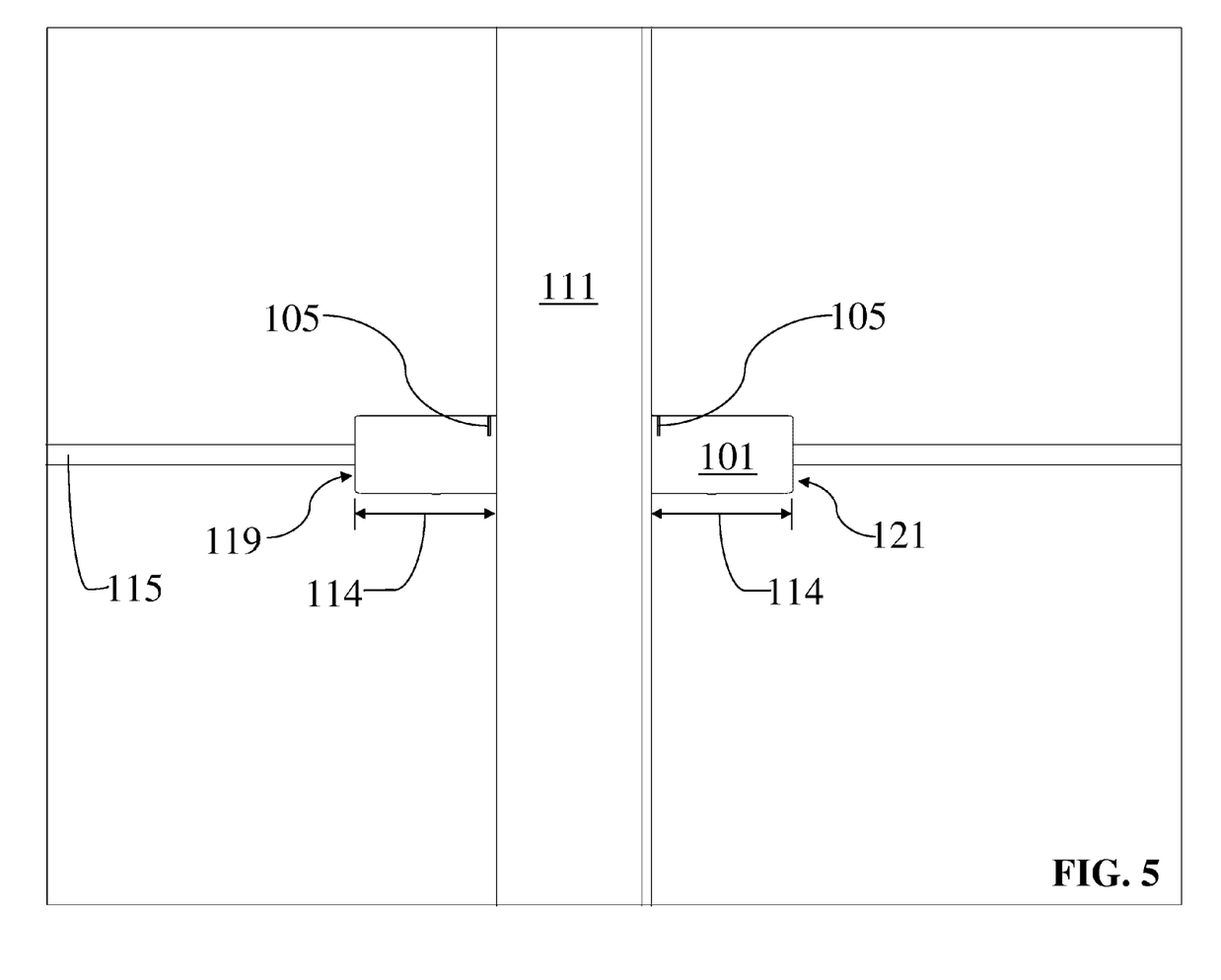
FIG. 5 is an elevation view of the installation of a sleeve for protecting wire or cable of the present invention.
Figure 6:
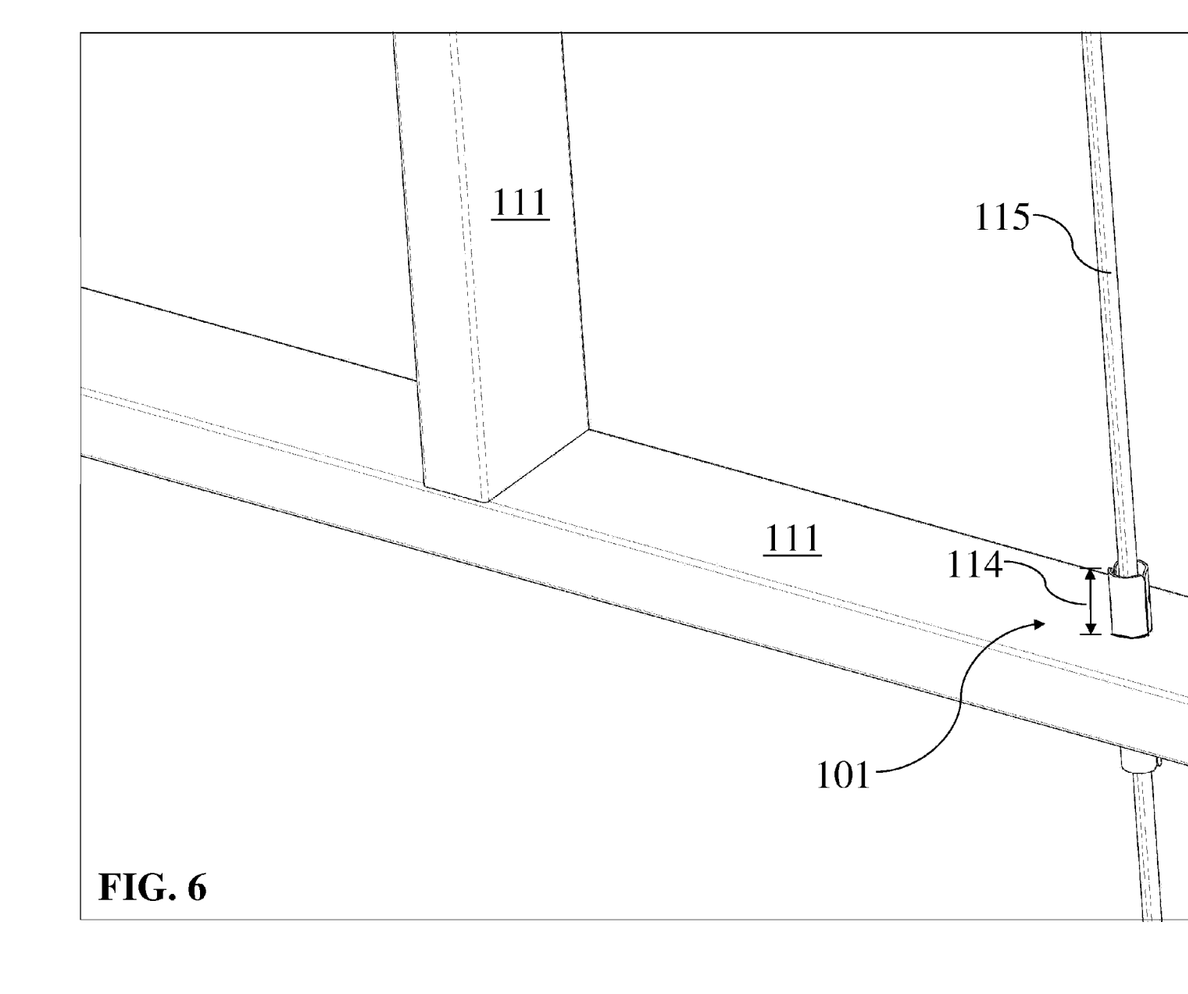
FIG. 6 is a side perspective view of the vertical installation of a sleeve for protecting wire or cable of the present invention.

From FIGS. 4-6, it can be seen that once the sleeve 101 has been fully inserted into the stud aperture 113, a portion 114 of the sleeve 101 extends beyond the edge of the stud 111 on each side. This extended portion 114 of the sleeve 101 serves to further protect the enclosed wire or cable 115 from damage against nails or screws which are driven into studs. It is not uncommon in construction when walls are being put in place that the nails or screws which are intended to be driven directly into studs slightly miss their target and are driven just along the edge of the stud. The extended portion 114 of the sleeve 101 allows for extra protection of the wire or cable 115 and prevents nails or screws which are driven along the edge of the stud from damaging the wire or cable.

Shown in FIGS. 1, 3, 4 and 7 is the weakened bend line 103 of the sleeve 101. FIG. 4 shows a cable 115 which has been received by the sleeve 101 through the slit 117 which runs longitudinally along the length of the sleeve. Once the cable 115 has been received by the sleeve 101, the sleeve can be easily bent by hand compression around the cable 115, without the use of any hand tools, by means of the weakened bend line 103 which is situated opposite the slit 117 on the sleeve 101 and which also runs longitudinally along the length of the sleeve 101. The bend line 103 may be weakened due to a reduced material thickness, a perforation, or any similar method which could cause the bend line to be weakened such that it enables the sleeve to be easily bent by hand along the bend line, thereby closing the slit 117 to enclose the sleeve around the wire or cable 115.

Figure 7:
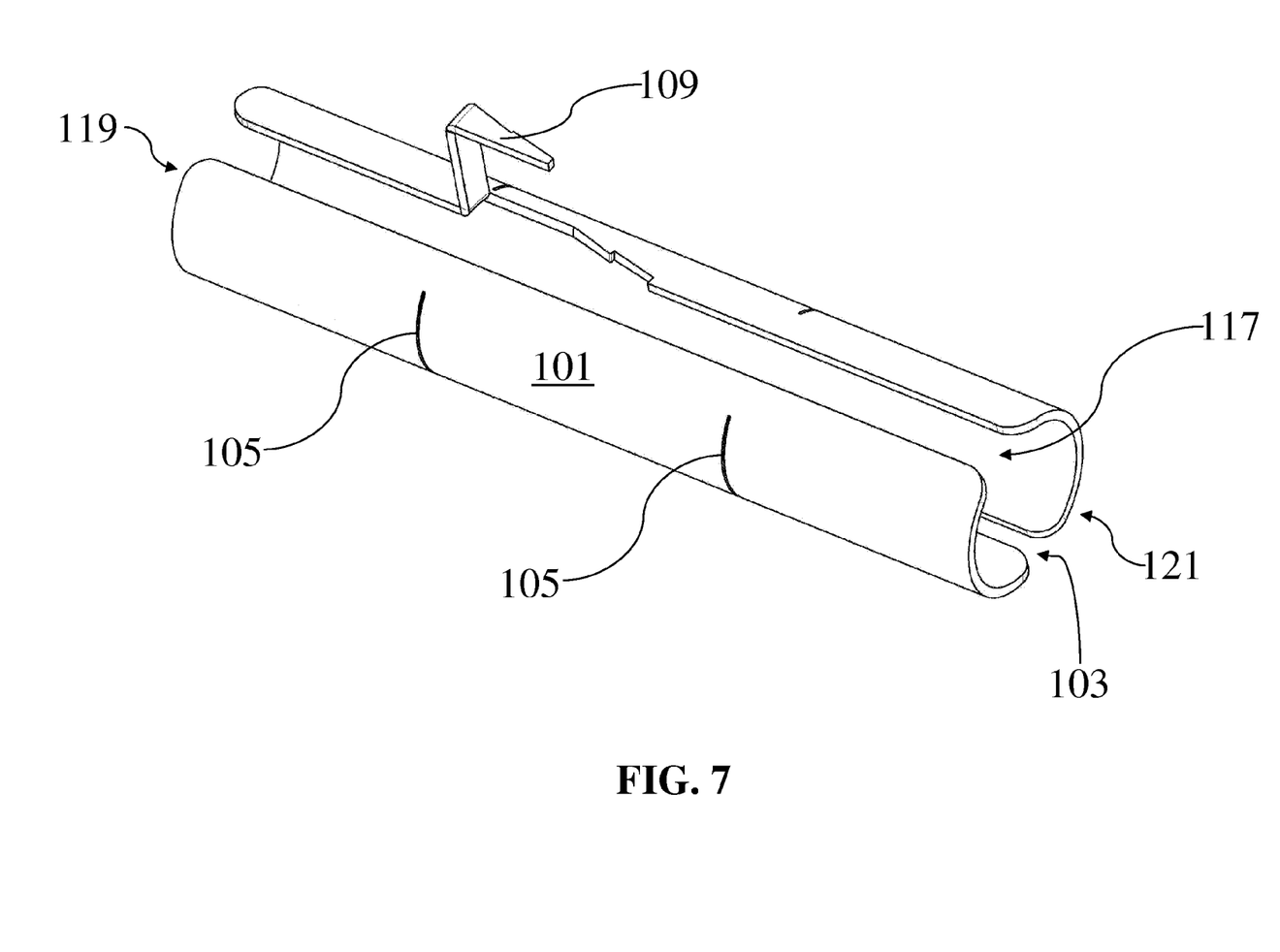
FIG. 7 is a side perspective view of an alternate embodiment of a sleeve for protecting wire or cable of the present invention.

Finally, shown in FIG. 7 is an alternate embodiment of the sleeve for protecting wire or cable of the present invention. In this embodiment, an integral nail 109 is used in place of the anti-rotation and stop tabs 107 which are shown in the other figures. Similar to the stop tabs 107, the integral nail 109 can serve the same purpose as the tabs to prevent rotation of the sleeve once inserted in an aperture in a stud, and also to prevent movement of the sleeve all the way through an aperture in a stud. Once the sleeve is installed onto the wire or cable and inserted into the aperture in the stud, the integral nail 109 can be driven into the stud to secure the sleeve in place.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A sleeve for protecting wire or cable which is run through an aperture in a stud, the sleeve comprising:
   a slit which runs longitudinally along the length of the sleeve so that the sleeve can receive the wire or cable;
   an opening at each end of the sleeve to allow for entrance and exit of the wire or cable once received by the sleeve;
   an extending portion at each end of the sleeve which extends beyond each edge of the stud once the sleeve is installed in the aperture to protect the wire or cable from nails or screws which are driven in at the edge of the stud or that miss the stud;
   an anti-rotation embossment which is located towards the middle of the sleeve and protrudes outward to prevent rotation and slippage of the sleeve once the sleeve is installed in the aperture;
   a bend line which runs longitudinally along the length of the sleeve and which is opposite the slit which runs longitudinally along the length of the sleeve; and
   wherein the bend line is weakened to allow the sleeve to be easily bent by hand compression at the bend line so that the sleeve can be installed around the wire or cable without the use of any hand tools.

2. The sleeve of claim 1, wherein the sleeve further comprises at least one visual positioning indicator located on an outer wall of the sleeve to aid in positioning the sleeve at the correct location within the aperture in the stud once the sleeve is installed on the wire or cable and inserted into the aperture in the stud.

3. The sleeve of claim 1, wherein the bend line is weakened by being perforated.

4. The sleeve of claim 1, wherein the bend line is weakened by having a reduced material thickness compared to the rest of the sleeve.

5. The sleeve of claim 1, wherein the sleeve is made of an impact resistant, high strength metal or plastic material.

6. The sleeve of claim 1, wherein the sleeve is stamped as a one-piece assembly.

7. A sleeve for protecting wire or cable which is run through an aperture in a stud, the sleeve comprising:
   a slit which runs longitudinally along the length of the sleeve so that the sleeve can receive the wire or cable;
   an opening at each end of the sleeve to allow for entrance and exit of the wire or cable once received by the sleeve;
   an extending portion at each end of the sleeve which extends beyond each edge of the stud once the sleeve is installed in the aperture to protect the wire or cable from nails or screws which are driven in at the edge of the stud or that miss the stud;
   an integral nail which protrudes from the outer wall of the sleeve to prevent the sleeve from sliding through the aperture once the sleeve is in place or rotating within the aperture in the stud;
   a bend line which runs longitudinally along the length of the sleeve and which is opposite the slit which runs longitudinally along the length of the sleeve; and
   wherein the bend line is weakened to allow the sleeve to be easily bent by hand compression at the bend line so that the sleeve can be installed around the wire or cable without the use of any hand tools.

8. The sleeve of claim 7, wherein the sleeve is stamped as a one-piece assembly.

9. The sleeve of claim 7, where in the sleeve further comprises at least one visual positioning indicator located on an outer wall of the sleeve to aid in positioning the sleeve at the correct location within the aperture in the stud once the sleeve is installed on the wire or cable and inserted into the aperture in the stud.

10. The sleeve of claim 7, wherein the sleeve is made of an impact resistant, high strength metal or plastic material.

* * * * *

UNITED STATES PATENT AND TRADEMARK OFFICE
CERTIFICATE OF CORRECTION

| | | |
|---|---|---|
| PATENT NO. | : 8,952,274 B2 | Page 1 of 1 |
| APPLICATION NO. | : 13/912990 | |
| DATED | : February 10, 2015 | |
| INVENTOR(S) | : Daniel Lalancette | |

It is certified that error appears in the above-identified patent and that said Letters Patent is hereby corrected as shown below:

In the Claims,

At column 2, line 36, the printed patent reads "...stud in once the sleeve..."; the patent should read --...stud 111 once the sleeve...--.

Signed and Sealed this
Twenty-third Day of June, 2015

Michelle K. Lee
*Director of the United States Patent and Trademark Office*